C. S. LOCKWOOD.
MEANS FOR RETAINING ROLLER BEARING SLEEVES ON SHAFTS.
APPLICATION FILED DEC. 23, 1909.
955,120. Patented Apr. 12, 1910.
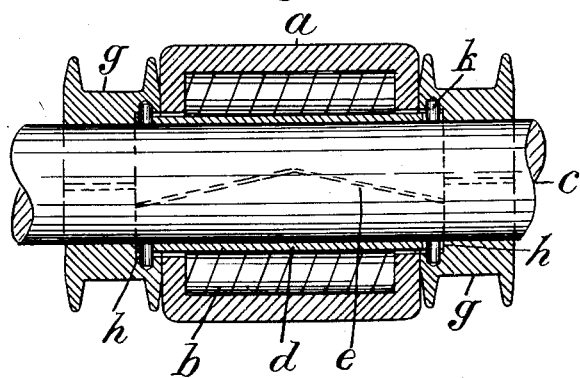
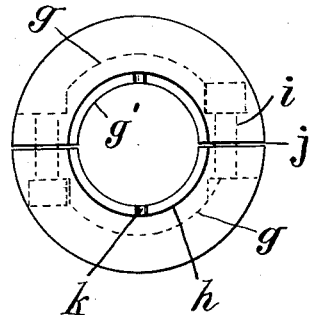
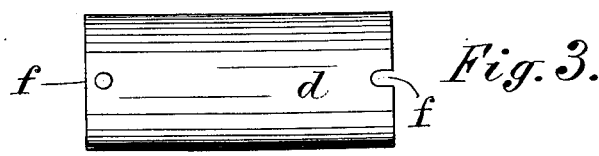
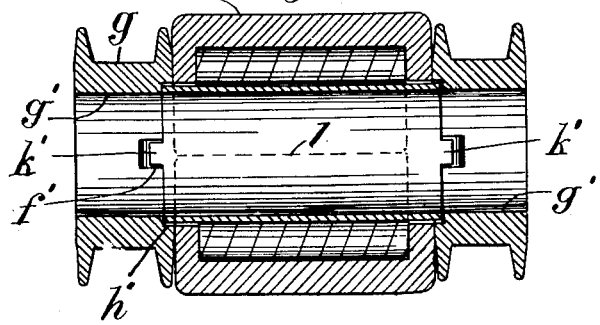
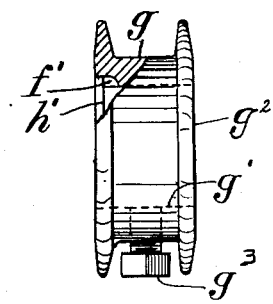
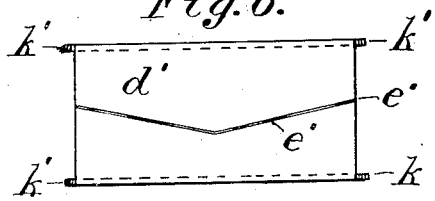
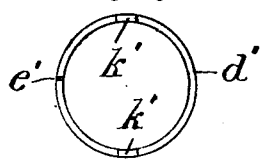

UNITED STATES PATENT OFFICE.

CHARLES S. LOCKWOOD, OF NEWARK, NEW JERSEY, ASSIGNOR TO HYATT ROLLER BEARING COMPANY, OF HARRISON, NEW JERSEY, A CORPORATION OF NEW JERSEY.

MEANS FOR RETAINING ROLLER-BEARING SLEEVES ON SHAFTS.

955,120.  Specification of Letters Patent.  Patented Apr. 12, 1910.

Application filed December 23, 1909. Serial No. 534,585.

*To all whom it may concern:*

Be it known that I, CHARLES S. LOCKWOOD, a citizen of the United States, residing at 289 Market street, Newark, county of Essex, and State of New Jersey, have invented certain new and useful Improvements in Means for Retaining Roller-Bearing Sleeves on Shafts, fully described and represented in the following specification and the accompanying drawings, forming a part of the same.

This invention relates to that class of roller bearings in which a divided sleeve is applied to the shaft-journal within the antifriction-rolls, to protect the journal from wear, such sleeve being removable so that it can be readily applied to the shaft and renewed with equal facility when worn. Sleeves divided at one or at both sides have been commonly used, the bore of the sleeve being a little less than the diameter of the shaft so that when it is sprung upon the shaft and fitted to its proper position it is held elastically thereon by its frictional grip. It has been found that while such grip may serve to hold the sleeve upon the shaft while mounting the shaft and roller bearing in their working positions it does not prevent the sleeve from turning more or less upon the shaft, nor does it suffice to keep the sleeve from slipping endwise. The present invention provides means for preventing such endwise or rotary movement of the sleeve upon the shaft, by clamping a collar upon the shaft at the end of the sleeve to resist endwise movement, and when desired furnishing the collar and sleeve with some interlocking means to prevent rotary movement. In this invention, the sleeve is made to extend beyond the ends of the casing of the bearing, and one or more collars is or are clamped upon the shaft at the ends of the bearing and formed with a recess to loosely embrace the end of the sleeve, and the collar and sleeve are preferably formed with a projection and notch, or other form of engaging means, to interlock with one another. The casing of the bearing and the collars may be divided longitudinally if desired, to facilitate their application to the shaft.

Two modifications of the invention are shown in the drawing, in one of which the collars are provided with studs to engage notches in the ends of the sleeve, and in the other the sleeve is formed with integral studs or tongues to engage notches in the collar.

In the drawing, Figure 1 shows the inner end of one of the collars; Fig. 2 is a longitudinal section of a bearing provided with the improvements and a shaft not in section therein; Fig. 3 shows the side of one sleeve-section with notches in its opposite ends; Fig. 4 is an edge view of a collar with one portion broken away where hatched showing the bottom of the recess and a notch extended therefrom into the bore of the collar; Fig. 5 is a view similar to Fig. 1 with the studs upon the sleeve and the notches in the collars; Fig. 6 is a side view, and Fig. 7 an end view of the sleeve having the integral studs or tongues.

In Fig. 1, $a$ designates a casing containing a set of rolls $b$ to support a shaft $c$, the latter being provided with the wearing-sleeve $d$. This sleeve, as shown in Figs. 1 and 2, is divided into two separate sections separated by oblique joints $e$ as is usual. Each section of the sleeve projects beyond the ends of the casing and has a hole or notch $f$ in each end. (See Fig. 3.) Such hole or notch is termed a "socket" herein.

Divided collars $g$ are shown with bore $g'$ applied to the shaft at the ends of the casing and furnished each with an annular recess $h$ upon the end next to the casing to loosely embrace or cover the projecting end of the sleeve. The collar-sections are shown in Fig. 1 with screws $i$ inserted across their joint $j$ to clamp them tightly upon the shaft, but the recess at the same time clearing the sides of the sleeve and not, therefore, operating to clamp them upon the shaft.

Opposite radial studs $k$ are shown fitted in the periphery of the recess $h$ to engage the holes or notches $f$ upon the ends of the sleeve. The bottoms of the recesses $h$ abut the ends of the sleeve and thus hold it from slipping endwise upon the shaft; while the studs $k$ by engagement with the sockets $f$ serve to prevent the sleeve from rotation upon the shaft. The sleeve-sections hug the shaft by an elastic grip when subjected to the pressure of the rolls $b$, and it is found that the rolls operate in practice to stretch the outer part of the sleeve-sections and thus curl the bodies of the sections into close contact with the shaft.

Figs. 4, 5 and 6 show a construction in which the sleeve $d'$ is divided, at one side only, by an oblique joint $e'$, and the studs made integral with the sleeve in the form of tongues $k'$ projected from the opposite ends of the sleeve.

The collars shown in Figs. 4 and 5 have shallow recesses $h'$ which serve to hold the sections of the sleeve upon the shaft when handled apart from the bearing, and sockets or notches $f'$ are milled in the bore of the collar at the bottom of the recess suitable to admit and engage the studs $k'$ upon the sleeve. The notches $f'$ and the studs $k'$ perform the same function as the sockets $f$ and stud $k$ of Fig. 2, and the bottom of the recess $h'$ holds the sleeve from end movement the same as the bottom of the recess $h$ which abuts the end of the sleeve in Fig. 2. The recess in the collar is made of greater depth with the construction in Fig. 2 than in Fig. 5 to permit the insertion of the radial studs $k$ and to support such studs over the exterior of the sleeve in engagement with the notch $f$.

The essential part of the invention is the provision of interlocking means to engage one or both of the collars with the end of the sleeve to prevent the rotation of the sleeve upon the shaft, the longitudinal movement of the sleeve being also prevented by such engagement, or by the abutting of the collars with the projecting ends of the sleeve. Fig. 1 shows the collar divided to facilitate its application to the shaft at any point, and held upon the shaft by the clamping action of the bolts $i$; but Figs. 4 and 5 show integral collars $g^2$ with set-screws $g^3$ to secure them in place, and as such integral collars perform all the functions of the divided collar in this invention, it is obvious that the collar need exercise no clamping action upon the sleeve to hold it from turning by mere friction. Such solid collars are applied to the shaft by slipping them over the end of the same as is common, and the casing is shown with a longitudinal division $l$ in Fig. 5 for application to the shaft between such collars.

This invention is especially applicable to sleeves divided at one or both sides, as such sleeves are liable to slip upon the shaft when set in place thereon; and the use of such sleeves is very extensive as they may be made of sheet-metal, rolled to cylindrical form, at much less expense than a tubular bored sleeve. The invention thus overcomes all the objections to the use of split sleeves, which cannot retain themselves tightly upon the shaft like a tightly fitting solid sleeve.

It is obvious that a single collar having a stud $k$ fitted to the hole $f$ at the left hand end of Fig. 3 serves effectually to prevent longitudinal movement of the sleeve or any rotation of the same, and such single collar, therefore, fully embodies the invention with or without a collar at the opposite end of the sleeve.

Having thus set forth the nature of the invention what is claimed herein is:

1. In a roller bearing, the combination, with the casing, the anti-friction rolls and shaft supported thereby, of a divided sleeve fitted to the shaft within the rolls and projected beyond the ends of the casing, and one or more collars secured upon the shaft adjacent the ends of the casing and having each a recess inclosing one end of the sleeve and abutting at its bottom with such end to hold the sleeve from end movement.

2. In a roller bearing, the combination, with the casing, the anti-friction rolls and shaft supported thereby, of a divided sleeve fitted to the shaft within the rolls and projected beyond the ends of the casing, a collar secured upon the shaft adjacent the end of the casing and having a recess inclosing one end of the sleeve and abutting at its bottom with such end to hold the sleeve from end movement, and means upon the sleeve and the collar for holding the sleeve from rotation.

3. In a roller bearing, the combination, with the casing, the anti-friction rolls, and a shaft supported thereby, of a divided sleeve fitted to the shaft within the rolls and projected beyond the ends of the casing, a divided collar secured upon the shaft at each end of the casing and having a recess larger than the sleeve, abutting the end of the sleeve, and a projection upon one of the parts engaging a notch in the opposite part to hold the sleeve from rotation.

4. In a roller bearing, the combination, with the casing, the anti-friction rolls, and a shaft supported thereby, of a divided sleeve fitted to the shaft within the rolls and projected beyond the ends of the casing, and such projecting end provided with the notches $f$, a divided collar secured upon the shaft at each end of the casing and having a recess abutting the end of the sleeve, and the side of the recess clearing the outside of the sleeve and having a stud to engage the said notch to hold the sleeve from rotation.

5. In a roller bearing, the combination, with the casing, the anti-friction rolls, and a shaft supported thereby, of a divided sleeve having two sections held elastically upon the shaft with its ends projected beyond the ends of the casing, a divided collar secured upon the shaft at each end of the casing and having a recess abutting the end of the sleeve, and a projection upon one of the parts engaging a notch in the opposite part to hold the sleeve from rotation.

6. In a roller bearing, the combination, with a casing divided longitudinally, and anti-friction rolls with a shaft supported thereby, of a divided sleeve having two sections held elastically upon the shaft with its ends projected beyond the ends of the casing and formed with the notches $f$, a divided collar clamped upon the shaft at each end of the casing and having a recess abutting the end of the sleeve, and studs in opposite sides of the recess engaging the notches upon the ends of both the sleeve-sections.

In testimony whereof I have hereunto set my hand in the presence of two subscribing witnesses.

CHARLES S. LOCKWOOD.

Witnesses:
H. W. ELWELL,
J. G. WEISS.